(12) United States Patent
Child

(10) Patent No.: US 12,178,771 B2
(45) Date of Patent: Dec. 31, 2024

(54) MEMORY FOAM PADS FOR LIFT SWINGS AND SLINGS

(71) Applicant: Deborah Child, Spokane, WA (US)

(72) Inventor: Deborah Child, Spokane, WA (US)

(*) Notice: Subject to any disclaimer, the term of this patent is extended or adjusted under 35 U.S.C. 154(b) by 187 days.

(21) Appl. No.: 18/152,281

(22) Filed: Jan. 10, 2023

(65) Prior Publication Data
US 2024/0115447 A1   Apr. 11, 2024

Related U.S. Application Data

(60) Provisional application No. 63/414,930, filed on Oct. 11, 2022.

(51) Int. Cl.
| | |
|---|---|
| *A61G 7/10* | (2006.01) |
| *B32B 5/18* | (2006.01) |
| *B32B 5/32* | (2006.01) |
| *B32B 25/04* | (2006.01) |
| *B32B 25/16* | (2006.01) |

(52) U.S. Cl.
CPC ............ *A61G 7/1051* (2013.01); *A61G 7/109* (2013.01); *B32B 5/18* (2013.01); *B32B 5/32* (2013.01); *B32B 25/045* (2013.01); *B32B 25/16* (2013.01); *A61G 2203/70* (2013.01); *B32B 2266/12* (2016.11); *B32B 2307/30* (2013.01); *B32B 2307/7265* (2013.01); *B32B 2535/00* (2013.01)

(58) Field of Classification Search
None
See application file for complete search history.

(56) References Cited

U.S. PATENT DOCUMENTS

| | | | | |
|---|---|---|---|---|
| 1,876,832 | A * | 9/1932 | Bancroft | A61G 7/1061 5/89.1 |
| 4,882,798 | A * | 11/1989 | Worsnop | A61G 7/10 294/67.31 |
| 5,729,843 | A * | 3/1998 | Manthey | A61G 7/1017 5/89.1 |
| 2006/0080775 | A1* | 4/2006 | McWattie | A61G 7/1051 5/89.1 |
| 2021/0338507 | A1* | 11/2021 | Kolek | A61G 7/1051 |

* cited by examiner

*Primary Examiner* — Adam C Ortiz
(74) *Attorney, Agent, or Firm* — Brennan, Manna & Diamond, LLC

(57) ABSTRACT

The present invention relates to a novel lift swing pad made of memory foam material. The pad is cuboidal and is configured to be separately positioned on slings of a lift sling or lift swing such that the legs and/or arms (i.e., appendages) of a user sitting in the swing places legs on the pads to prevent the slings from folding under the user and to prevent the slings from pulling on the skin of the user. The pad has a hook and loop fastener for attaching to the slings and in one embodiment, has a heating layer for providing a soothing effect to the user. In some embodiments, the pad is made of waterproof neoprene. The pad helps maintain optimal blood circulation within the extremities while a person is being supported by the sling.

13 Claims, 5 Drawing Sheets

MEMORY FOAM PADS FOR LIFT SWINGS AND SLINGS

CROSS-REFERENCE TO RELATED APPLICATION

The present application claims priority to, and the benefit of, U.S. Provisional Application No. 63/414,930, which was filed on Oct. 11, 2022, and is incorporated herein by reference in its entirety.

FIELD OF THE INVENTION

The present invention relates generally to the field of memory foam pads and lift swings. More specifically, the present invention relates to a novel memory foam pad configured to be used in conjunction with a U-shaped lift swing for handicapped and senior individuals. The pad has memory foam material and has hook and loop fastener for attaching to slings of the swing. The pad improves comfort while a patient is being transferred to and from different locations such as bed, wheelchair, toilet, and more. Accordingly, the present disclosure makes specific reference thereto. Nonetheless, it is to be appreciated that aspects of the present invention are also equally applicable to other such applications, devices and methods of manufacture.

BACKGROUND

By way of background, handicapped individuals and individuals with limited physical dexterity are often required to move from one location to another within a facility such as a medical care facility, home, room, and more. Medical professionals and caregivers commonly aid handicapped individuals in being transferred to and from a wheelchair, bed, bath, and much more. A U-shaped sling or Hoyer patient lift is commonly used by professionals and caregivers and is a mobility tool used to help individuals with mobility challenges get out of the bed or the bath.

The U-Shaped Sling's especially avoids the placement of the sling under a patient's buttocks and the positioning of hooks at the shoulders level avoids the phenomenon of compression during a transfer. However, when a patient sits on the slings, the slings generally pull on the skin of the patient and cause pain, discomfort, and severe irritation. Senior individuals may experience excess pressure on the skin which may cause tearing and irritation, thus, increasing discomfort for both the individual and caregivers.

Many people, for providing comfort to the thighs and skin of the individual, keep towels or soft cloths underneath the legs and/or arms of the individual sitting in the U-shaped sling, however, such cloth is uncomfortable, do not maintain their shape and may cause slipping of the individual from the slings which can cause an injury. Both patients and caregivers desire an improved way and a device for providing comfort to a patient while the patient is being transferred to and from different locations such as a bed, a wheelchair, a toilet, and more.

Therefore, there exists a long-felt need in the art for a device that can be used in conjunction with a U-shaped lift swing for handicapped and senior individuals. There is also a long-felt need in the art for a soft and comfortable device that provides comfort to the thighs and skin of an individual while transferring the individual using a U-shaped lift swing. Additionally, there is a long-felt need in the art for a padded device that can detachably attached to slings of a U-shaped or Hoyer sling. Moreover, there is a long-felt need in the art for a foam padded device that provides comfort to legs and/or arms (i.e., appendages) of a user while the user is supported in a U-shaped sling. Further, there is a long-felt need in the art for a U-shaped sling pad device that prevents excess pressure on the skin of a supported user to prevent tearing and irritation. Furthermore, there is a long-felt need in the art for a soft pad device that eliminates use of placing cloth or other ineffective materials on slings for preventing skin irritation and tearing. Finally, there is a long-felt need in the art for a device and a way for improving comfort while a patient is being transferred to and from different locations such as bed, wheelchair, toilet, and more, using a U-shaped or Hoyer sling.

The subject matter disclosed and claimed herein, in one embodiment thereof, comprises a memory foam padded sling cover for U-shaped lift swing. The padded sling cover is configured to detachably attach to each sling of the U-shaped lift swing for preventing the slings from folding under the legs and/or arms (i.e., appendages) of a user and causing excess pressure. The padded sling cover includes a memory foam pad having a length and a width defining a perimeter for the cover, the cover having a soft top surface and a bottom surface, a hook and a loop fastener overlying the bottom surface, wherein the fastener is configured to detachably attach to a sling of the lift swing. The padded sling cover when placed on a sling is positioned under the leg of a user supported in the U-shaped lift swing for preventing direct contact of skin of the leg of the user with the sling.

In this manner, the U-shaped lift swing memory foam pad of the present invention accomplishes all of the forgoing objectives and provides users with a comfortable memory foam pad used in conjunction with a U-shaped lift swing for handicapped individuals, or limited mobility seniors and patients. The pads are soft and are placed under the legs while the patient is lifted in the sling, preventing excess pressure on the skin to prevent tearing and irritation. The pads remain firmly secure to the slings and thus does not slide or slip. The pads eliminate manual placing of clothing on slings and easily helps in maintaining optimal blood circulation within the extremities while supported by the sling.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a padded sling cover made of memory foam material. The padded sling cover is configured to detachably attach to each sling of a U-shaped lift swing for preventing the slings from folding under legs and/or arms (i.e., appendages) of a user. The padded sling cover, in one exemplary embodiment, is cuboidal and further comprising a memory foam pad having a length and a width defining a perimeter, the cover having a top surface and a bottom surface, a hook and a loop fastener overlying the bottom surface, wherein the fastener is configured to detachably attach to a sling of the lift swing, the memory foam pad has a uniform thickness from about 1 inch to about 4 inches. The padded sling covers when placed on a sling is positioned under each leg of a user supported in the U-shaped lift swing for preventing direct contact of the skin of legs and/or arms of the user with the sling and thus preventing excess pressure on the skin to prevent tearing and irritation.

In yet another embodiment, a heating layer is disposed on a top of the memory foam pad, wherein the heating layer is formed of heating gel.

In yet another embodiment, the cover is made of breathable and skin-safe memory foam pad.

In yet another embodiment, the cover is waterproof and made of neoprene and encloses the memory foam pad.

In yet another embodiment, the cover is made of waterproof neoprene rubber.

In yet another embodiment, the cover may have a logo or any other indicia. The logo may comprise any insignia, badge, emblem, decoration, alphanumeric symbol, or artistic rendition that adheres, either permanently or removably, to the cover.

The subject matter disclosed and claimed herein, in one embodiment thereof, comprises a U-shaped or Hoyer lift equipped with a pair of detachably attached memory foam pads. The lift further comprising a pair of slings for supporting legs and/or arms (i.e., appendages) of a user, a back support for supporting a back of a user, a pair of memory foam pads, each foam pad is attached to a sling of the pair of slings, each foam pad has about a 2-inch thick memory foam having a hook and loop fastener at the bottom surface thereof, wherein a user when supported in the lift places each respective leg on the associated foam pad, thereby improving comfort while a patient is being transferred to and from different locations such as a bed, a wheelchair, a toilet, and more.

In yet another embodiment, a method for maintaining optimal blood circulation within the legs and/or arms (i.e., appendages) of a user while supported by a U-shaped lift swing is described. The method includes the steps of providing a pair of soft memory foam pads, each pad having a hook and loop attachment at the bottom surface thereof, attaching one memory foam pad on each sling of the U-shaped lift swing such that length of the memory foam pad extends along the length of the sling and width of the memory pad is substantially aligned with the width of the sling, supporting the user in the U-shaped lift swing such that the memory foam pads are positioned between the legs and/or arms of the user and slings, wherein the memory foam pads support the legs and prevent excess pressure on the skin to prevent tearing and irritation.

In yet another embodiment, the memory pad device of the present invention is easily and efficiently manufactured, marketed, and available to consumers in a cost-effective manner and is easily placed and used by users for enabling medical professionals and caregivers to aid handicapped individuals for transferring to and from a wheelchair, bed, bath, and much more.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
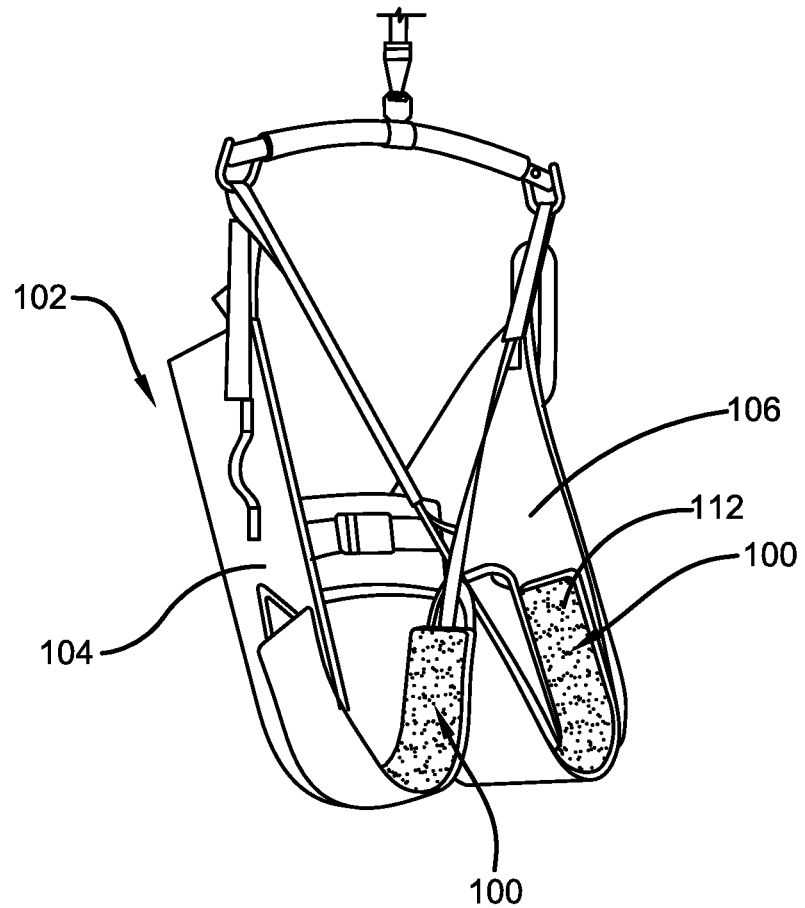
FIG. 1 illustrates a perspective view of a U-shaped lift swing equipped with a padded sling cover of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that can be used in conjunction with a U-shaped lift swing for handicapped and senior individuals, or other mobility restricted people (i.e., non-ambulatory). There is also a long-felt need in the art for a soft and comfortable device that provides comfort to the thighs and skin of an individual while transferring the individual using a U-shaped lift swing. Additionally, there is a long-felt need in the art for a padded device that can detachably attached to slings of a U-shaped or Hoyer sling. Moreover, there is a long-felt need in the art for a foam padded device that provides comfort to legs and/or arms (i.e., appendages) of a user while the user is supported in a U-shaped sling. Further, there is a long-felt need in the art for a U-shaped sling pad device that prevents excess pressure on the skin of a supported user to prevent tearing and irritation. Furthermore, there is a long-felt need in the art for a soft pad device that eliminates use of placing cloth or other ineffective materials on slings for preventing skin irritation and tearing. Finally, there is a long-felt need in the art for a device and a way for improving comfort while a non-ambulatory patient is being transferred to and from different locations such as a bed, a wheelchair, a toilet, and more, using a U-shaped or Hoyer sling.

The present invention, in one exemplary embodiment, is a method for maintaining optimal blood circulation within the legs and/or arms of a patient while supported by a U-shaped lift swing is described. The method includes the steps of providing a pair of soft memory foam pads, each pad having a hook and loop attachment at the bottom surface thereof, attaching one memory foam pad on each sling of the U-shaped lift swing, such that length of the memory foam pad extends along the length of the sling and a width of the memory pad is substantially aligned with the width of the sling, supporting the patient in the U-shaped lift swing such that the memory foam pads are positioned between the legs and/or arms of the user and slings, wherein the memory foam pads support the legs and prevent excess pressure on the skin to prevent tearing and irritation.

Referring initially to the drawings, FIG. 1 illustrates a perspective view of a U-shaped lift swing equipped with padded sling cover of the present invention in accordance with the disclosed architecture. The padded sling cover 100 of the present invention is designed as a comfortable memory foam pad to attach to slings of the lift sling 102. Individual sling covers 100 are configured to be positioned on the slings 104, 106 such that the padded covers 100 are positioned under and along opposing sides of the associated legs and/or arms (i.e., appendages) of a user sitting on the lift sling 102. The padded cover 100 of the present invention is generally cuboidal in shape and is positioned or oriented longitudinally along a sling of the lift sling 102. As illustrated, the cover 100 is flexible and soft, and has a width less than, or substantially equal to, the width of each sling 104, 106.

Figure 2:
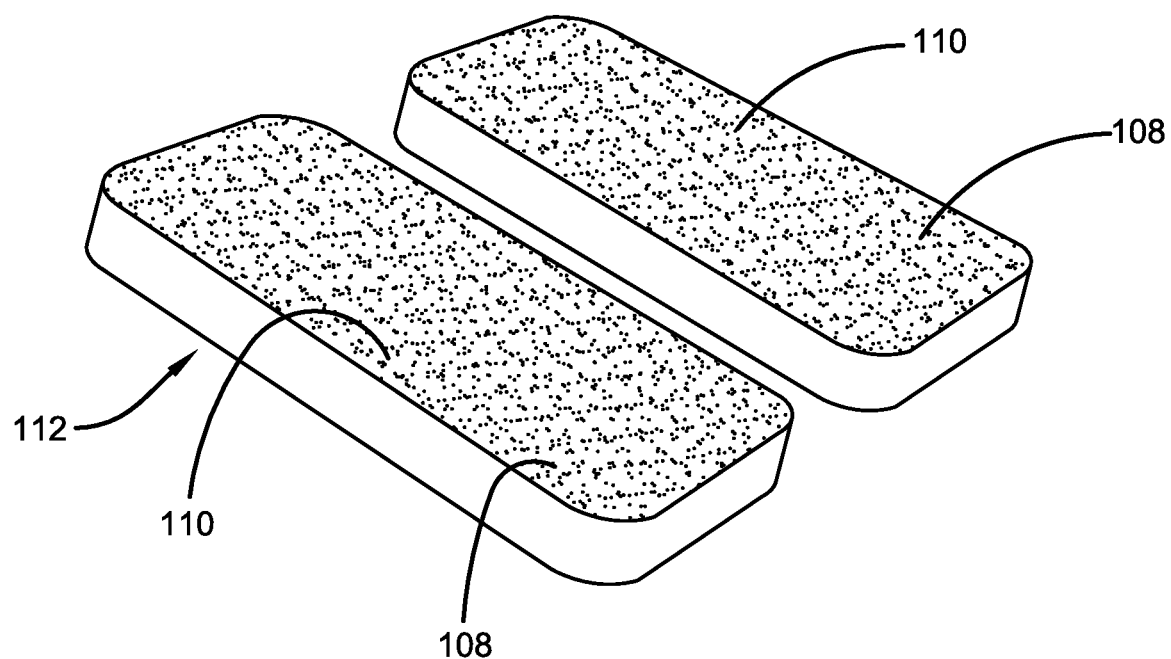
FIG. 2 illustrates a perspective view of a pair of sling pad covers of the present invention in accordance with the disclosed architecture.

In one exemplary embodiment, the sling cover 100 has a width in the range from about 2 inches to about 5 inches and a length in the range from about 8 inches to about 24 inches to meet requirements of users of different sizes. The sling cover 100 has a bottom surface 108 having a hook and loop fastener or other attachment mechanism 110 disposed thereon for allowing the cover 100 to easily and securely be placed on a sling without any slipping and sliding as illustrated in FIG. 2. The fastener 110 also allows the cover 100 to attach to the sling easily and detachably without any manual effort. The opposite top surface 112 of the cover 100 has a soft and ergonomic surface such that the cover 100 feels soft and smooth to the legs and/or arms of the user sitting in the lift sling 102 and thus preventing direct contact of the skin with the slings 104, 106 as illustrated in FIG. 3 and therefore, preventing excess pressure on the skin to prevent tearing and irritation.

The memory foam pad 100 is bendable and conforms to the shape and movement of the sling 104, 106 when a user sits in the lift sling 102 and also when the lift sling 102 is not used by a user. The pad cover 100 is made of memory foam and has a preferred thickness from about 1 inch to about 4 inches for providing adequate comfort while a user is supported on the sling 104, 106. Referring to FIG. 3, in one embodiment, when the foam pad cover 100 is compressed, the foam pad 100 generally conforms to the shape and configuration of the element providing the compression force upon the foam pad (e.g., the legs and/or arms of the user supported in the lift sling 102).

FIG. 2 illustrates a perspective view of a pair of sling pad covers of the present invention in accordance with the disclosed architecture. The hook and loop fastener 110 extends across the bottom surface 108 to substantially cover a portion of the bottom surface 108. In one exemplary embodiment, a protective layer (not illustrated) can cover the fastener 110 for protecting the fastener 110 from any physical damage. The top surface 112 is soft and ergonomic and does not cause any irritation to skin of the user.

Figure 3:
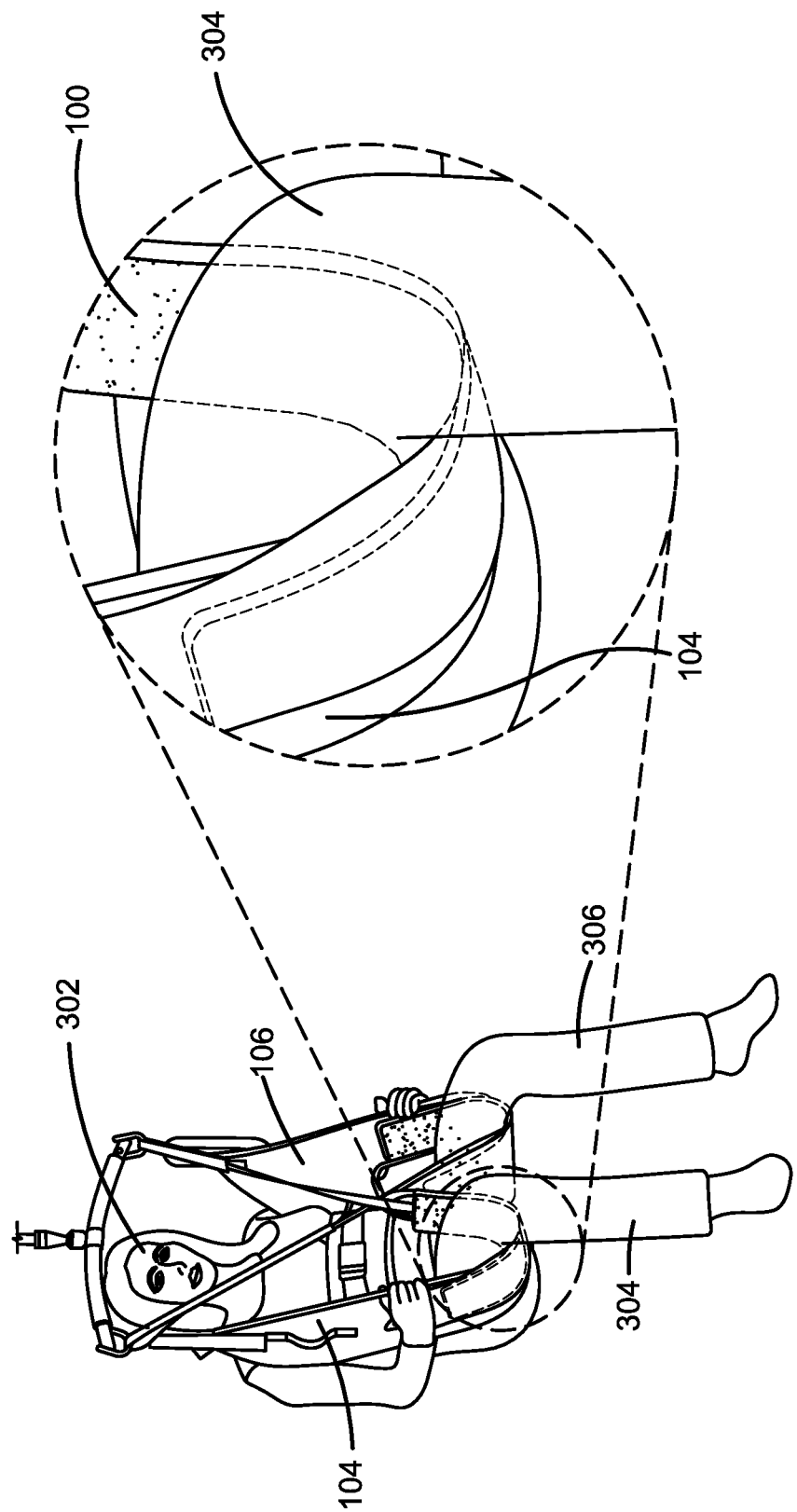
FIG. 3 illustrates a perspective view of a user sitting in the U-shaped lift swing equipped with the memory foam pads of the present invention in accordance with the disclosed architecture.

FIG. 3 illustrates a perspective view of a user sitting in the U-shaped lift swing equipped with the memory foam pads of the present invention in accordance with the disclosed architecture. As illustrated, a user 302 sits on the lift swing 102 in a conventional manner such that each memory foam pad 100 is positioned under legs 304, 306 of the user 302, thereby preventing any direct contact between the legs 304, 306 and the slings 104, 106. The thickness of the memory foam pad allows comfort to the legs 304, 306 while the patient 302 is being transferred to and from different locations such as a bed, a wheelchair, a toilet, and more.

When the swing 102 is not used by the user 302, then, the pads 100 can be detached from the slings 104, 106 for easy and secure storage. In one embodiment, the pad 100 can be integrated to each sling of the swing 102. The pad 100 can have any logo or indicia in different embodiments of the present invention.

Figure 4:
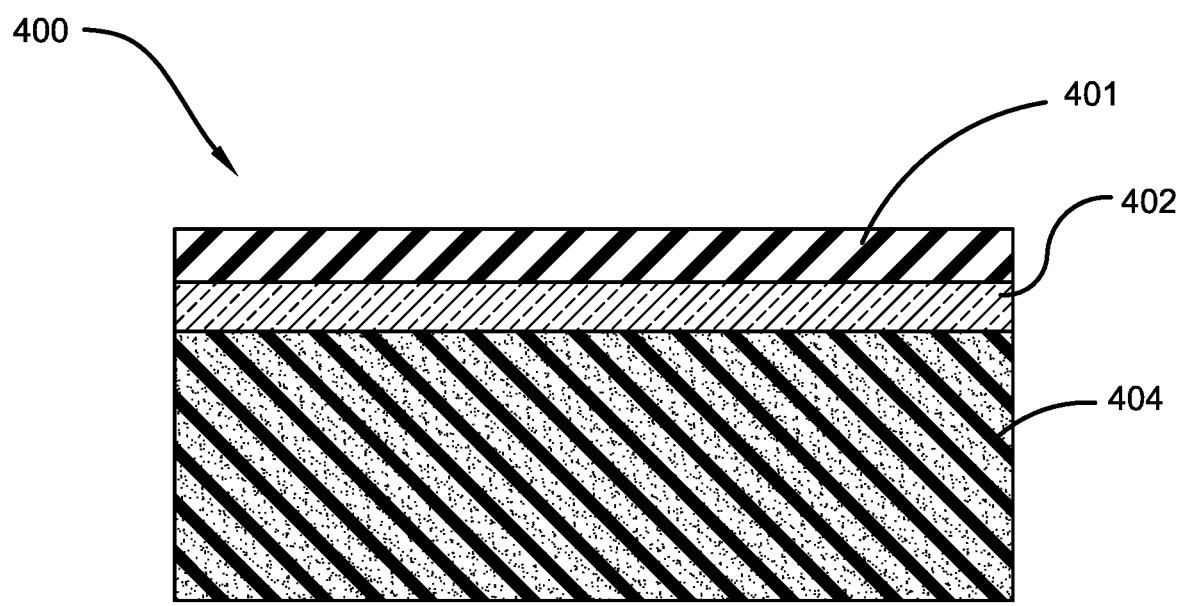
FIG. 4 illustrates a cross sectional view of another embodiment of the sling memory pad cover of the present invention in accordance with the disclosed architecture.

FIG. 4 illustrates a cross section view of another embodiment of the sling memory pad cover of the present invention in accordance with the disclosed architecture. In the present invention, the memory pad cover 400 has an exterior waterproof layer of neoprene 401, a heating layer 402 disposed between the exterior layer 401 and the memory foam 404. The heating layer 402 can be in the form of heating gel which provides a heating effect to the legs and/or arms (i.e., appendages) of a user for soothing effect. In use, the heating layer 402 touches the leg of a user sitting in the lift swing 102 and heals and provides comfort to the user while being supported in the lift swing 102. It should be noted that in some embodiments, an ice pack may also be disposed on a top of the memory foam 404. The heating layer 402 can be detachably or permanently attached to the memory foam 404 in different embodiments of the present invention.

Figure 5:
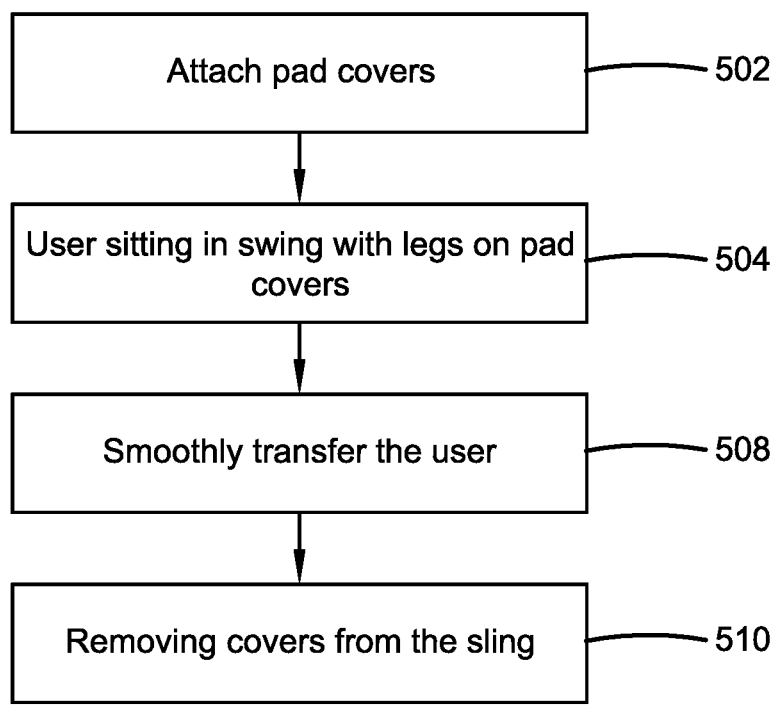
FIG. 5 illustrates a flow chart depicting a process of using the memory foam pad cover of the present invention for maintaining optimal blood circulation within the extremities while supported by the sling in accordance with the disclosed architecture.

FIG. 5 illustrates a flow chart depicting a process of using the memory foam pad cover of the present invention for maintaining optimal blood circulation within the extremities while supported by the sling in accordance with the disclosed architecture. Initially, a pair of sling memory foam pad covers are each respectively attached to an associated sling of a U-shaped or Hoyer swing using hook and loop fasteners (Step 502). The cover is positioned along a length of the slings and remains affixed to the slings without any slipping or sliding. Then, a user sits on the slings and is supported by the back support of the swing as well (Step 504). When the user who can be a patient, senior individual, or any other non-ambulatory user sits in the swing, the legs are positioned on the memory foam pad covers, thereby improving comfort, and eliminating pressure on the skin to prevent tearing and irritation.

During transfer of the user to and from different locations such as a bed, a wheelchair, a toilet, and more, the user is transferred smoothly without the slings pulling on the skin of the user (Step 506). Finally, the covers are removed and are stored securely as per preferences of users (Step 508).

In some embodiments, the sling pad cover is available as a waterproof version utilizing neoprene, or other waterproof material, as an exterior layer for use in bathing, soaking, swimming, and comprise various embodiments that can be used in hospitals, nursing homes, hospice care situations, swimming pools, standard households, and much more.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "padded sling cover", "sling cover", "memory foam pads", "memory foam pad cover", "padded cover", and "cover" are interchangeable and refer to the U-shaped lift swing memory foam pad 100 of the present invention.

Notwithstanding the forgoing, the U-shaped lift swing memory foam pad 100 of the present invention can be of any suitable size and configuration as is known in the art without affecting the overall concept of the invention, provided that it accomplishes the above-stated objectives. One of ordinary skill in the art will appreciate that the U-shaped lift swing memory foam pad 100 as shown in the FIGS. are for illustrative purposes only, and that many other sizes and shapes of the U-shaped lift swing memory foam pad 100 are well within the scope of the present disclosure. Although the dimensions of the U-shaped lift swing memory foam pad 100 are important design parameters for user convenience, the U-shaped lift swing memory foam pad 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A padded sling cover for attaching to slings of a U-shaped lift swing, the padded sling cover comprising:
   a plurality of padded sling covers wherein each said padded sling cover attachable to a sling of the U-shaped lift swing;
   wherein each said padded sling cover having a memory foam pad including a width generally equal to a width of the sling of the U-shaped lift swing;
   wherein said width of said memory foam pad slightly less than the width of the sling of the U-Shaped lift swing;
   wherein each padded sling cover is cuboidal in shape;
   wherein each said padded sling cover oriented longitudinally along a sling of the U-shaped lift swing;
   wherein each said padded sling cover having a width from about 2 inches to about 5 inches;
   wherein each said padded sling cover having a length from about 8 inches to about 24 inches;
   wherein each said padded sling cover having a thickness from about 1 inch to about 4 inches;
   wherein each said padded sling cover having a bottom surface including a hook and loop fastener for fastening each said padded sling cover to a sling of the U-shaped lift swing;
   wherein each said padded sling cover having a bottom surface including a hook and loop fastener for fastening each said padded sling cover to a sling of the U-shaped sling;
   wherein each said padded sling cover having a flexible material to conform to the shape and movement of the sling of the U-shaped lift swing; and
   further wherein at least two of said padded sling covers positioned under and along opposing sides of at least two appendages of a user held in the U-shaped lift swing to prohibit direct contact of the skin of a user of the U-shaped lift swing.

2. The padded sling cover of claim 1, wherein each said hook and loop fastener extending across said bottom surface substantially cover a portion of said bottom surface.

3. The padded sling cover of claim 2, wherein each said padded sling cover having a top surface of a soft material.

4. The padded sling cover of claim 3, wherein each said padded sling cover having a heating layer on a top surface of said memory foam.

5. The padded sling cover of claim 4, wherein said heating layer is a heating gel.

6. A padded sling cover for attaching to slings of a U-shaped lift swing, the padded sling cover comprising:
   a plurality of padded sling covers wherein each said padded sling cover attachable to a sling of the U-shaped lift swing;
   wherein each said padded sling cover having a memory foam pad including a width generally equal to a width of the sling of the U-shaped lift swing;
   wherein each said padded sling cover having an exterior layer of flexible and waterproof material to conform to the shape and movement of the sling of the U-shaped lift swing;
   wherein said exterior layer having a material of neoprene;
   wherein each said padded sling cover oriented longitudinally along a sling of the U-shaped lift swing; and
   further wherein at least two of said padded sling covers positioned under and along opposing sides of at least two appendages of a user held in the U-shaped lift swing to prohibit direct contact of the skin of a user of the U-shaped lift swing;
   wherein each said padded sling cover having a bottom surface including a hook and loop fastener for fastening each said padded sling cover to a sling of the U-shaped lift swing;
   wherein each said padded sling cover having a bottom surface including a hook and loop fastener for fastening each said padded sling cover to a sling of the U-shaped sling.

7. The padded sling cover of claim 6, wherein each said padded sling cover is cuboidal in shape.

8. A padded sling cover for attaching to slings of a U-shaped lift swing comprising:
   a plurality of padded sling covers wherein each said padded sling cover attachable to a sling of the U-shaped lift swing;

wherein each said padded sling cover having a memory foam pad including a width generally equal to a width of the sling of the U-shaped lift swing;

wherein each said padded sling cover having an exterior layer of flexible and waterproof material to conform to the shape and movement of the sling of the U-shaped lift swing;

wherein said exterior layer having a material of neoprene;

wherein each said padded sling cover oriented longitudinally along a sling of the U-shaped lift swing;

wherein at least two of said padded sling covers positioned under and along opposing sides of at least two appendages of a user held in the U-shaped lift swing to prohibit direct contact of the skin of a user of the U-shaped lift swing;

wherein each said padded sling cover having a bottom surface including a hook and loop fastener for fastening each said padded sling cover to a sling of the U-shaped lift swing; and further wherein said hook and loop fastener extending across said bottom surface to substantially cover a portion of said bottom surface.

9. The padded sling cover of claim 8, wherein each said padded sling cover having a heating layer between said exterior layer and said memory foam.

10. The padded sling cover of claim 9, wherein said heating layer is a heating gel.

11. The padded sling cover of claim 10, wherein each said padded sling cover is cuboidal in shape.

12. The padded sling cover of claim 11, wherein each said padded sling cover oriented longitudinally along a sling of the U-shaped lift swing.

13. The padded sling cover of claim 12, wherein each said padded sling cover having a width from about 2 inches to about 5 inches, and a length from about 8 inches to about 24 inches.

* * * * *